Nov. 6, 1928.
H. L. TANNER
1,690,142
REGULATING DYNAMOTOR
Filed July 26, 1927
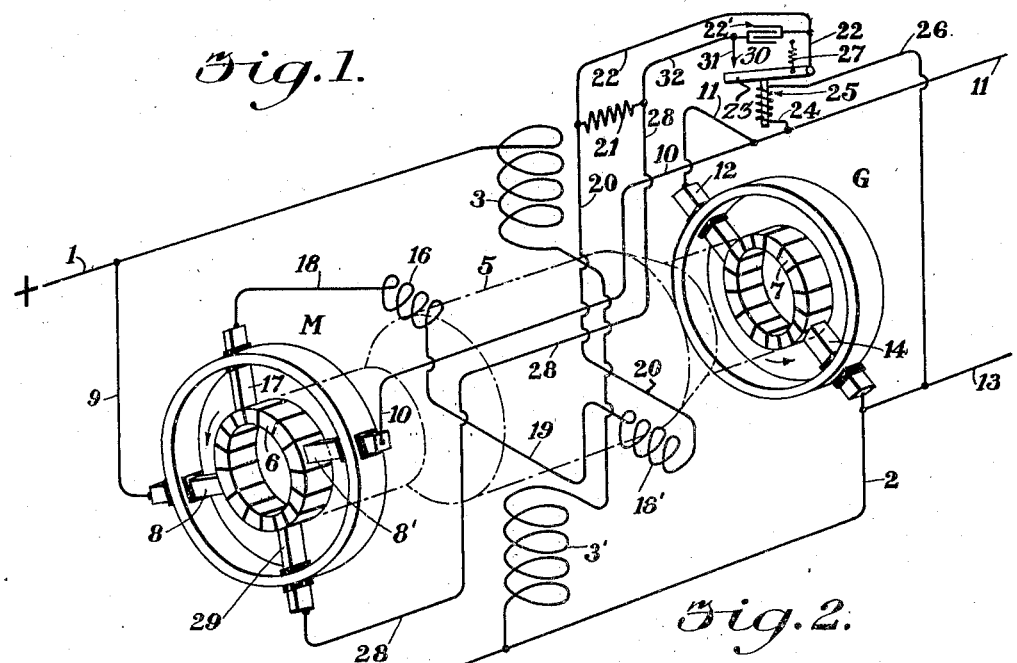
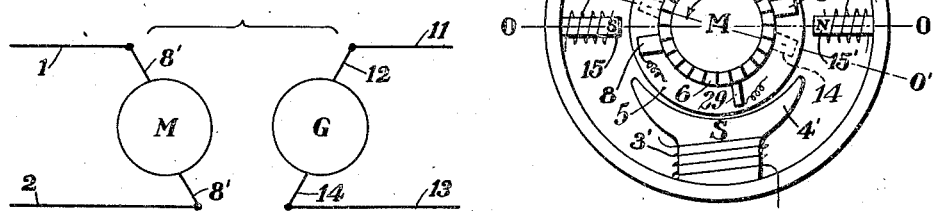
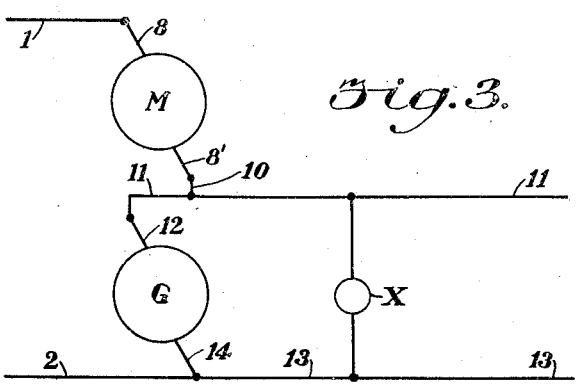
INVENTOR
Harry L. Tanner
BY
Moakley & Gill
ATTORNEYS Patented Nov. 6, 1928.

1,690,142

UNITED STATES PATENT OFFICE.

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK.

REGULATING DYNAMOTOR.

Application filed July 26, 1927. Serial No. 208,467.

This invention relates to electrical circuits in which it is desired to maintain a substantially constant potential across the line, but wherein disturbing influences tend to change the value of the potential in a preponderant direction. Thus, it is proposed to so control such a circuit that if it has an occasional or an inherent tendency to suffer an undesired drop in potential, there will be a regulation that will offset such tendency and substantially avoid a change in electrical pressure.

Such a circuit as has been referred to may, for example, be subject to a drop in potential, if no means be provided to counteract the drop, and, as applied to such a circuit, the present invention has the effect of boosting the voltage of the generator supplying the circuit. Obviously, if a circuit has a tendency to acquire too high a voltage, this invention may be conformed to the requirements of such a condition, whereby the potential of the generator is bucked to an extent that will substantially maintain the potential constant.

In carrying out the invention, it is an object to effect the operation of a motor and a generator combined into one machine using a common field structure and to provide a regulating circuit associated with both the motor and the generator windings. The regulating circuit includes means for so affecting the operation of the motor that the magnetic field is rotated as related to the motor brushes, while with respect to the generator brushes it is rotated in a reverse sense. Accordingly, the change in electromotive-force of the generator offsets the tendency of a change in potential in the circuit to which it supplies current. Further means are provided, which are brought into action upon any overcorrective effort when the correction has attained its proper proportions.

Referring now to the drawings.

Fig. 1 is a diagrammatic perspective view, showing a load-carrying circuit and the regulating apparatus combined therewith;

Fig. 2 shows the motor end of the dynamoelectric machine included in the apparatus, and discloses the arrangement of the main and regulating poles and brushes;

Fig. 3 is a simplified diagram of the main circuits of the arrangement shown in Fig. 1; and Fig. 4 is a similar view of a modified arrangement.

In the drawings, 1 and 2 represent direct current supply conductors across which field coils 3 and 3' are connected. These coils may be of any suitable number and encircle main pole-pieces, such as are shown at 4 and 4' in Fig. 2, two such coils and pole-pieces being shown for convenience. The pole-pieces 4, 4' with the main field coils 3, 3' in place thereon are mounted in the usual field yoke, and are positioned so that an armature 5 may rotate between them, the armature being suitably mounted in any of the usual and well-known ways.

As shown in dot and dash lines in Fig. 1, a single armature 5 is common to both the motor M and the generator G, it being understood that the armature core has the armature windings of both the motor and the generator wound upon it. The armature winding of the motor is connected to the segments of a commutator 6, while the armature winding of the generator is connected to the segments of another commutator 7 at the opposite end of the armature. If desired, the relationship may be preserved and other arrangements may be had, as, for instance, both commutators may be on one end of the armature, and, if desired, concentrically arranged. Another arrangement may be had wherein the motor commutator may be adjacent to the generator commutator.

Bearing on the motor commutator 6 are the main brushes 8 and 8', current being conveyed from the positive supply conductor 1 by a conductor 9 to the brush 8 that has segmental contact with commutator 6, passing through the motor armature winding and by a portion of the commutator 6 to a brush 8'. From the latter brush current travels by way of conductor 10 to the generator main 11, which comes from the brush 12 that bears on the generator commutator 7. After passing through any suitable translating devices, as at X in Fig. 3, the current returns by the generator main 13, the generator circuit continuing through the brush 14, generator commutator 7 and the generator winding, while the motor circuit goes from the main 13 to the negative supply conductor 2.

Midway between the main field pole-pieces 4 and 4' are mounted auxiliary pole-pieces 15 and 15', shown in Fig. 2, on which auxiliary field coils 16 and 16' are respectively wound. The coils 16 and 16' are in a regulating circuit which extends from the motor armature winding by the regulating brush 17 that bears on the motor commutator 6. A conductor 18 leads from brush 17 to coil 16, thence the regulating circuit continues by conductor 19 to the other coil 16', proceeding therefrom by a conductor 20 to a resistance 21. Whether the current flows through the resistance 21, or goes by a conductor 22 to a switch arm 23 depends upon whether a predetermined potential exists across the mains 11 and 13.

Current will flow from main 11 by conductor 24, through the coil of an electromagnet 25 and by conductor 26 to the main 13, and the switch arm 23 will rapidly vibrate in response to minor fluctuations in the potential across the mains 11, 13. The magnet 25 will attract the switch arm 23 in opposition to a spring 27 to its circuit-opening position whenever the potential starts to increase. Under these circumstances, the current will flow through the resistance 21, and return by a conductor 28 to the other regulating brush 29 and through the commutator 6 and the motor armature winding. The presence of the resistance 21 in circuit with the field coils 16 and 16' substantially nullifies the effect of these coils upon the field and no regulating action takes place.

When, however, there is a sufficient variance in the potential across the mains 11 and 13, as, say, for example, a drop in potential, the consequent weakening of the coil of magnet 25, in that case, permits the spring 27 to become predominant, whereupon the switch arm 23 is moved into engagement with a contact 30. This results in the resistance 21 becoming short-circuited, so that the current which was described as flowing through the resistance goes instead by conductor 22 to the now closed switch arm 23, passing to the contact 30, and proceeding by conductors 31 and 32 to conductor 28, and through regulating brush 29 and the motor armature winding, as before.

The effect of the removal of the resistance 21 from the regulating circuit is to cause the magnetization of the auxiliary pole-pieces 15 and 15' by their respective coils 16 and 16', thus producing a shifting of the magnetic field. When the armature 5 and commutators 6 and 7 rotate counter-clockwise in unison, as indicated in Figs. 1 and 2, such shifting of the magnetic field is clockwise.

Prior to the shifting of the magnetic field, i. e., before the auxiliary field coils 16 and 16' are effective, the neutral line is perpendicular to the direction of the lines of force between the main north pole 4 and the main south pole 4', as in ordinary dynamo-electric machines. With the neutral line O—O, shown in Fig. 2, thus passing through the central horizontal planes of auxiliary poles 16 and 16', the brushes 8 and 8' at the motor end are disposed so that the left hand main brush 8 is a little below the neutral line O—O, and the right hand main brush 8' is similarly above it, as shown in Fig. 2. At the generator end, the left hand main brush 12, shown in dotted lines in Fig. 2, is correspondingly set above the neutral line O—O, while the main right hand generator brush 14 is set below neutral line O—O in like manner. In other words, the neutral axis of the commutator lies between the brushes of the motor and the brushes of the generator, or the brushes for the motor are arranged on opposite sides of the neutral axis from those of the generator.

Consequently, when the resistance 21 is short circuited, there is the resultant magnetization of the auxiliary pole-pieces 15 and 15' by the auxiliary coils 16 and 16', as explained. Under these circumstances, both the illustrated main north pole-piece 4 and the auxiliary north pole-piece 15' are magnetized, and there is a consequent north pole of the magnetic field which is displaced clockwise to some extent from the center of the main north pole-piece 4. Similarly, the now similtaneously magnetized main south pole-piece 4' and the auxiliary south pole-piece 15 produce a consequent south pole of the magnetic field, which is correspondingly displaced clockwise from the center of the main south pole-piece 4'. It is thus obvious that the magnetic field has been shifted.

It is well known that the maximum electro-motive-force is obtained when the brushes are on the neutral magnetic line, and is weakened when the brushes are moved away therefrom. Therefore, when the hereinbefore described shifting of the magnetic field takes place, the neutral magnetic line O—O, shown in Fig. 2, will have been rotated clockwise away from the main motor brushes 8 and 8' and toward the generator brushes 12 and 14 to a position O'—O'. Manifestly, this results in weaking the field with respect to the motor, since it is equivalent to moving the main motor brushes 8 and 8' away from the magnetic neutral line. On the other hand, it also amounts, in effect, to moving the generator brushes 12 and 14 toward the magnetic neutral line, whereby the field is strengthened with respect to the generator.

Inasmuch as the voltage across the direct current supply conductors 1 and 2 remains substantially the same, and must be responded to by the motor portion of the dynamo-electric machine, the speed of the armature 5 is increased by way of compensation. Hence, the generator is operated at a higher rate, and, with its brushes 12 and 14 arranged reversely to the magnetic neutral line as compared with the motor brushes 8 and 8′, so that the poles as related to the generator are strengthened, there is a resulting further increased electro-motive-force by the generator. When the electromotive-force reaches its predetermined value the coil of the electromagnet 25 will have had its strength so increased that the electromagnet will again attract the switch arm 23 opening that part of the regulating circuit which extends from resistance 21 to the switch 23—30. A condenser 22′ connected across conductors 22 and 31 avoids sparking when the switch is opened and closed.

Upon the opening of the switch by the attraction of its switch arm 23, the resistance 21 is again included in the regulating circuit. As previously explained this substantially nullifies the effect of the regulating coils 16 and 16′, and it is apparent that the correction for the change in potential is terminated without an over-correction. In practice, the correction for a change of potential is begun and terminated so quickly that the armature 23 vibrates rapidly and the potential is maintained substantially constant.

As set forth hereinbefore and easily understood from the simplified diagram of Fig. 3, the current flowing from the direct current supply conductor 1 flows through brush 8 and the armature of the motor M, continuing by brush 8′ and conductor 10 to the generator main 11, through the translating device or devices X, and back by generator main 13 to the negative supply conductor 2. In the application of the invention illustrated in Figs. 1 and 3, the translating device or devices X are supplied with current developed by the generator G, which flows from the generator brush 12 through the conductor 11, in the same direction as the flow of current from the motor M, the current from both the generator G and motor M passing through the translating device or devices X, the current from generator G returning thereto by conductor 13 and brush 14, while the motor current returns by way of the negative supply conductor 2. In accordance with what has been previously set forth herein, when the demands on the generator mains 11, 13 tend to cause a drop in potential across these mains, the apparatus described in connection with Fig. 1 acts to speed up the operation of the generator G thereby increasing its electromotive-force.

While, in the illustrated embodiment of the invention two auxiliary brushes 17 and 29 have been employed, the invention may be practiced with excellent results with the use of only one auxiliary brush. In such case, the brush 29, for example, may be dispensed with, and the brush 17 retained. Under these circumstances, the conductor 28 will be connected to the main brush 8′, instead of to auxiliary brush 29 which is then discarded, the circuits being otherwise unchanged. It is also possible to operate the electrical apparatus herein disclosed by dispensing with both auxiliary brushes 17 and 29, in which case the conductors 18 and 28 are connected to the main brushes. The invention obviously may be applied to circuits wherein there is a necessity for bucking the generated electro-motive-force, instead of boosting it.

The diagram of Fig. 4 shows an arrangement in which the motor and generator circuits are maintained separate, as is desirable in some instances, but in which it will be understood that a mechanical unity equivalent to that of the apparatus of Fig. 1 is preserved in the sense that the generator is responsive to the motor drive to produce the same effects as were described in the first set forth form of the invention.

I claim:

1. In combination, an electrical circuit, a generator connected thereacross and having commutator brushes, a motor in unitary combination with the generator, and regulating means controlled by the potential of said circuit to shift the magnetic field with respect to said brushes thereby altering the action of the motor in response to potential variations of said circuit thereby changing the operation of the generator.

2. In combination, a dynamo electric machine formed in part as a motor having commutator brushes and in part as a generator, a current supply circuit for the motor part, a circuit energized by the generator part and subject to potential variation, and a regulating circuit responsive to such variation and adapted to affect the magnetic field to shift the same with respect to said brushes to vary the field strength thereby altering the operation of the generator part to tend to offset the potential variation.

3. In combination, a dynamo electric machine constituting a unitary motor and generator each having commutator brushes, a current supply circuit for the motor, a circuit energized by the generator and subject to potential variation, and a regulating circuit comprising electro-magnetic means electrically combined with the motor, means to neutralize said electro-magnetic means, and controlling means responsive to potential variation in the generator circuit to nullify said neutralizing means to effect a shifting of the magnetic field with respect to said brushes to vary its strength in reverse senses with respect to the motor and generator and cause the latter to tend to offset the potential variance.

4. In combination, a dynamo electric machine constituting a unitary motor and generator having commutator brushes, main and auxiliary field magnets and armatures arranged for concomitant operation, a motor circuit energized by the generator subject to potential variance, and a regulating circuit comprising resistance adapted to neutralize the effect of said auxiliary field magnets, and controlling means responsive to variance of the potential of the generator circuit to short circuit said resistance and cause a shifting of the magnetic field in relatively opposite directions with respect to the motor and generator brushes to cause the generator to offset the potential variance.

5. In combination, a dynamo electric machine constructed to form a motor having main and auxiliary commutator brushes and also to form a generator concomitantly operable with the motor and having commutator brushes, a motor supply circuit, a circuit energized by the generator subject to potential variance, main and auxiliary field magnets, and a regulating circuit connected to some of the motor brushes including an auxiliary brush and comprising resistance adapted to neutralize the effect of said auxiliary field magnets, and controlling means responsive to potential variance in the generator circuit to short circuit said resistance and effect a shifting of the magnetic field in relatively opposite senses with respect to the motor and generator brushes to offset the potential variance.

6. In combination, a dynamo electric machine constituting a unitary motor and generator having main and auxiliary field magnets and unified armatures provided with commutators, motor and generator commutator brushes the neutral line of the magnetic field lying between those of the former and latter, a circuit energized by the generator, and a regulating circuit comprising resistance in circuit with the auxiliary field magnets adapted to neutralize the effect thereof, and control means responsive to potential variation in the generator circuit to short circuit said resistance and cause a shifting of the magnetic field relative to said brushes to vary the field strength in reverse senses with respect to the motor and generator.

7. In combination, a dynamo-electric machine constituting a unitary motor and generator having a magnetic field and commutating means including brushes and arranged so that the neutral axis of the commutating means lies between the brushes of the motor and the brushes of the generator and means to relatively shift the magnetic field and the brushes in response to a variation of potential.

8. In a dynamotor, a motor and a generator having a common magnetic field and commutating means having a neutral axis and including brushes for the motor and for the generator arranged on opposite sides of the neutral axis and means to alter the relation between the neutral axis and the brushes in response to variations of potential.

9. In combination, a dynamo-electric machine constituting a unitary motor and generator included in electrical circuits and having a magnetic field, the motor and generator each being provided with commutating means including brushes and arranged so that the neutral axis of the commutating means lies between the brushes of the motor and the brushes of the generator and means responsive to variations of potential for relatively shifting the magnetic field and the brushes.

10. In a dynamotor, a motor and a generator having a common magnetic field and each provided with commutating means including brushes and arranged so that the neutral axis of the commutating means of the motor lies on one side of the brushes for the motor and the neutral axis of the commutating means of the generator lies on the opposite side of the brushes for the generator and means to alter the relation between the neutral axis and the brushes in response to variations of potential.

11. In combination, a dynamo-electric machine constituting a unitary motor and generator having main and auxiliary field magnets, unified armatures provided with commutating means including brushes and arranged so that the neutral axis of the commutating means lies between the brushes of the motor and the brushes of the generator, a motor supply circuit, a circuit energized by the generator, a regulating circuit comprising a resistance for neutralizing the auxiliary field magnets when a certain potential prevails in the generator circuit and means including an electro magnetic switch responsive to variations of potential in the generator circuit to short circuit the resistance to cause a relative shifting of the magnetic field and the brushes to vary the strength of the magnetic field in reverse senses with respect to the motor and generator to cause the latter to tend to offset the variations of potential in the generator circuit.

12. In combination, a dynamo-electric machine constituting a unitary motor and generator having main and auxiliary field magnets, unified armatures provided with commutating means including brushes and arranged so that the neutral axis of the commutating means lies between the brushes of the motor and the brushes of the generator, a motor supply circuit, a circuit energized by the generator, a regulating circuit comprising a resistance for neutralizing the auxiliary field magnets when a certain potential prevails in the generator circuit, means including an electro magnetic switch responsive to variations of potential in the generator circuit to short circuit the resistance to cause a relative shifting of the magnetic field and the brushes to vary the strength of the magnetic field in reverse senses with respect to the motor and generator to cause the latter to tend to offset the variations of potential in the generator circuit and anti-sparking means associated with said switch.

In testimony whereof I affix my signature.

HARRY L. TANNER.